United States Patent
Launay et al.

(10) Patent No.: US 7,120,212 B1
(45) Date of Patent: Oct. 10, 2006

(54) DEVICE AND METHOD FOR RECEIVING WITH AT LEAST TWO RECEPTION CHANNELS, AND CORRESPONDING USE

(75) Inventors: Erwan Launay, Rennes (FR); Bertrand Sueur, Chantepie (FR)

(73) Assignees: Telediffusion de France, Paris Cedex (FR); France Telecom, Paris (FR)

( * ) Notice: Subject to any disclaimer, the term of this patent is extended or adjusted under 35 U.S.C. 154(b) by 0 days.

(21) Appl. No.: 09/830,232

(22) PCT Filed: Nov. 15, 1999

(86) PCT No.: PCT/FR99/02799

§ 371 (c)(1),
(2), (4) Date: Jul. 5, 2001

(87) PCT Pub. No.: WO00/30290

PCT Pub. Date: May 25, 2000

(30) Foreign Application Priority Data

Nov. 13, 1998 (FR) .................................. 98 14438

(51) Int. Cl.
H04B 7/10 (2006.01)
H04B 1/10 (2006.01)

(52) U.S. Cl. ........................................ 375/347; 375/349
(58) Field of Classification Search ............... 375/347, 375/147, 148, 150, 152, 316, 341, 346, 349
See application file for complete search history.

(56) References Cited

U.S. PATENT DOCUMENTS

| | | | |
|---|---|---|---|
| 5,127,025 A | * | 6/1992 | Okanoue .................... 375/232 |
| 5,553,102 A | | 9/1996 | Jasper et al. |
| 5,559,757 A | * | 9/1996 | Catipovic et al. ........... 367/134 |
| 6,058,138 A | * | 5/2000 | Fukumasa et al. .......... 375/130 |
| 6,574,293 B1 | * | 6/2003 | Khayrallah et al. ......... 375/347 |

FOREIGN PATENT DOCUMENTS

WO 90/16118 12/1990

OTHER PUBLICATIONS

"An Adaptive Diversity for OFDM in Fading Channels"; Bulumulla, S.; Kassam, S.; Venkatesh, S.; p. 1325-1329; 1998 IEEE; XP-002110961.

* cited by examiner

*Primary Examiner*—Khanh Tran
*Assistant Examiner*—Sam K. Ahn
(74) *Attorney, Agent, or Firm*—Merchant & Gould P.C.

(57) ABSTRACT

The invention relates to a reception device implementing at least two reception paths supplied with data flows, each conveying the same source symbols, each of said paths comprising estimation means, associating, with each source symbol received, an estimated path value and a corresponding path confidence information element, and comprising means for the combination of said estimated path values into an adapted estimated value, said combination taking account of said path confidence information elements to weight said estimated path values. Said estimation means advantageously comprises means for the estimation of the transmission channel, delivering said path confidence information elements. Said combination means may advantageously associate an adapted confidence information element with each of said adapted estimated values, as a function of said path confidence information elements.

8 Claims, 1 Drawing Sheet

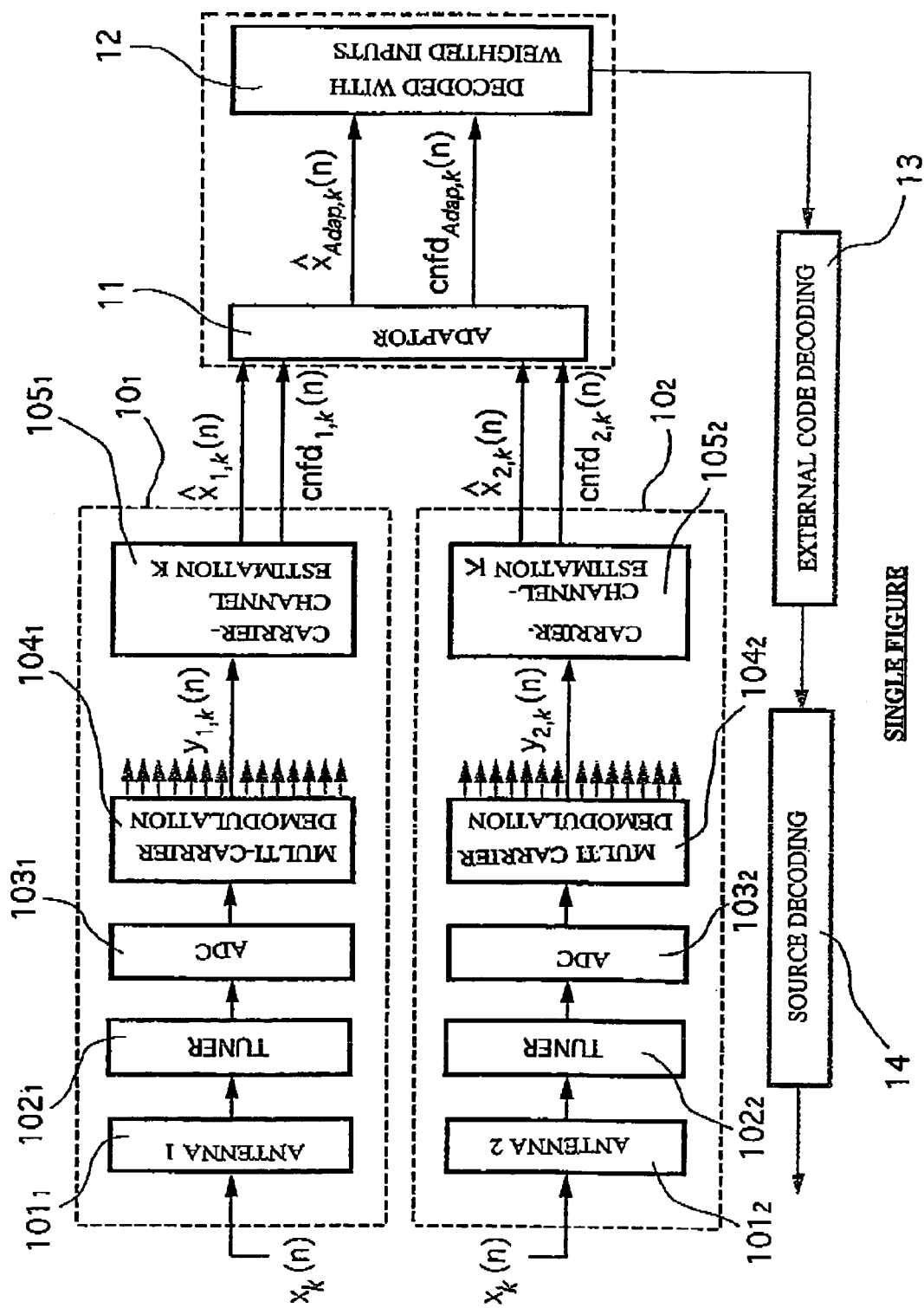

DEVICE AND METHOD FOR RECEIVING WITH AT LEAST TWO RECEPTION CHANNELS, AND CORRESPONDING USE

CROSS-REFERENCE TO RELATED APPLICATIONS

This application is a 371 of PCT/FR99/02799, filed Nov. 15, 1999.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The field of the invention is that of the reception of digital signals, in the field of receivers implementing at least two distinct reception paths, namely two paths supplied with distinct data flows but conveying (at least partially) the same source symbols.

BRIEF SUMMARY OF THE INVENTION

Thus, the invention can be applied especially to receivers implementing antenna diversity, each antenna receiving the same sent signal but with possibly different disturbances, the transmission channels being distinct. More generally, the invention can be applied in all cases where two distinct data flows bearing the same source symbols are available (whether these flows are similar or transmitted on different frequency bands and/or channels, encoded and/or modulated in different ways, etc.).

A particular field of application of the invention is that of the RF broadcasting of digital television signals (for example according to the DVB-T standard under development or the dTTb project), especially to mobile or portable receivers.

In this situation, it has already been proposed to use antenna diversity techniques. These techniques rely on the simultaneous reception, at several antennas, of one and the same sent signal. It is hoped that, as compared with a single antenna receiver (without diversity of antennas), not all the paths will undergo the same disturbances linked to the transmission channel and, therefore, that it will become possible to achieve a more satisfactory decoding of the signal obtained by recombining the signals present at each antenna.

This recombination is done by "weighting-summation", namely by computing, at each instant, a linear combination of the signals coming from each antenna. This can be done by several approaches which are distinguished by the associating weighting combining mode.

The equal gain combining (EGC) technique summates the signals in phase, the selection combining (SC) technique selects the signal with the highest signal-to-noise ratio, the maximum ratio combining (MRC) technique weights the signals by the ratio of the amplitude or their attenuation and the power of the additive noise that the channel makes them undergo before summating them in phase.

There are also approaches that implement a gradient-type adaptive filtering (also used in equalization) but they are considered to be complex to perfect and finalize and far too slow in their convergence for very many applications.

The maximum ratio combining (MRC) technique maximizes (on the assumption of signals undergoing an attenuation—related to the channel—and an additional noise—related to the first amplification stages—that are independent) the mean signal-to-noise ratio obtained after recombination and leads to results better than those of the EGC and SC techniques. It is this technique that is generally preferred for use.

The literature contains many examples of transmission systems using antenna diversity. According to these prior art techniques, the "weighting-summation" operation is achieved before demodulation or even before processing by the tuner (in radio frequencies or RF) so that the receiver thus obtained contains at most only one tuner, this tuner being a costly component.

This approach is relatively well suited to the case of narrow-band signals (namely cases that substantially undergo the same attenuation throughout their passband). Thus, the document U.S. Pat. No. 5,553,102 describes an implementation thereof, in the context of a single-carrier signal. According to this technique, the MRC combination delivers binary decisions. The use of these techniques on two wide-band signals on the contrary may prove to be highly sub-optimal, especially owing to the risk of fading or selective disturbances that affect only a part of the concerned frequency band.

Furthermore, since the MRC technique requires an estimation of the channel and the phasing of the signals, its use is often relinquished for the SC technique. However, in all cases, a problem may arise of the synchronization of the demodulator during the switching over from one reception path to the other.

There is also the known document, "Antenna Diversity for Digital Video Broadcasting" (J. G. W. Janssen et al.—document dTTb/WP3.2/Philips/24), that describes a system carrying out a recombination by selection after multicarrier demodulation (OFDM demodulation). This technique proves to be inefficient in practice and its development has not been pursued.

It is a goal of the invention in particular to overcome these drawbacks of the prior art.

More specifically, it is a goal of the invention to provide a device and a method of reception using at least two reception paths, for example in the form of a diversity of antennas, that are more efficient in terms of recombination quality, and hence of final decoding, than prior art techniques, especially for wideband signals.

Another goal of the invention is to provide a device of this kind and a method of this kind that are simple to implement without requiring any complex adaptation of the structures of known receivers.

In particular, it is a goal of the invention to provide a device and a method of this kind using information already available in receivers, said device and method being in conformity with the standards that are being developed.

These goals and others that shall appear hereinafter are achieved according to the invention by means of a reception device implementing at least two reception paths supplied with data flows, each conveying the same source symbols, each of said paths comprising estimation means, associating, with each source symbol received, an estimated path value and a corresponding path confidence information element. According to the invention, this reception device comprises means for the combination of said estimated path values into an adapted estimated value, said combination taking account of said path confidence information elements to weight said estimated path values.

Thus, according to the invention, the "weighting-combination" operations are performed just before the weighted-input decoding. The result is optimized since it takes account of the confidence information elements. The technique is simple to implement, as the exploited information elements are already available in the receiver.

Advantageously, said estimation means comprise means for the estimation of the transmission channel, delivering said path confidence information elements.

It is clear however that other types of confidence information elements may be used.

Preferably, said combination means associate an adapted confidence information element with each of said adapted estimated values, as a function of said path confidence information elements. These information elements then supply the weighted-inputs decoder.

According to a preferred embodiment of the invention, said adapted estimated value is computed as follows:

$$\hat{x}_{Adap,n} = \left(\sum_{i=1}^{N} cnfd_{i,n} \times \hat{x}_{i,n}\right) / \left(\sum_{i=1}^{N} cnfd_{i,n}\right)$$

where:

$\hat{x}_n$ is the estimated value of the symbol received on the path i;

$cnfd_{i,n}$ is the corresponding path confidence information element; and

N is the number of paths.

In this case, said adaptive confidence information element may advantageously be computed as follows:

$$cnfd_{Adap,n} = \sum_{i=1}^{N} cnfd_{i,n}$$

where:

$cnfd_{i,n}$ is the confidence information element associated with the path i; and N is the number of paths.

The data flows according to the invention may be of different types. According to one preferred embodiment of the invention, at least one of said data flows is transmitted by means of a multicarrier modulation.

Indeed, as shall be seen hereinafter, the invention is particularly well suited to this type of modulation.

In this case, said source symbols may be conveyed by a subset of the set of carriers implemented by said multicarrier modulation.

According to an advantageous embodiment of the invention, the device implements at least two antennas (antenna diversity) supplying distinct reception paths.

The invention is especially well suited to devices having a general three-level structure:

a first module shaping and demodulating the received signal for each of said reception paths;

a second module, for each of said reception paths, determining said estimated path values and said corresponding confidence information elements;

a third single module supplied by said second modules, and carrying out especially the combination, delivering said adapted estimated values and a weighted-input decoding supplied by said adapted estimated values.

The invention also relates to the method of reception implemented by the device described here above.

A method of this kind that implements at least two reception paths supplied by data flows each conveying the same source symbols, each of said paths implementing a step of estimation of the transmission channel, associating an estimated path value and a corresponding path confidence information element with each source symbol received, comprises according to the invention a step for the combination of said estimated values of paths delivered by each of said paths into an adapted estimated value, said combination taking account of said path confidence information to weight said estimated path values.

The invention also relates to the use of a device and/or of the method described here above, especially for the reception of data belonging to at least one of the following applications:

the broadcasting of digital television signals;
the broadcasting of audio-digital signals;
radio telephony;
the transmission of data signals.

DETAILED DESCRIPTION OF THE INVENTION

Other features and advantages of the invention shall appear more clearly from the following description of a preferred embodiment of the invention, given by way of a simple illustrative and non-restricted example, and from the appended single FIGURE. This FIGURE shows a simplified block diagram of a receiver in the special case of a COFDM modulation and a two-antenna diversity (only the processing of the carrier k being illustrated).

As indicated here above, an essential characteristic of the invention is the exploitation of the information elements intended for a weighted-input decoder that is present in the rest of the processing chain. Here below, we shall rapidly recall the principle of this technique.

Let $\hat{x}_n$ be an estimation of the nth symbol to be decoded and $cnfd_n$ a measurement of confidence in this estimation. The term "weighted-input decoding" designates any system of decoding which, on the basis of a set of pairs $\{(\hat{x}_n, cnfd_n)\}_n$, finally decodes a set of symbols $\{\hat{c}_n\}_n$, in seeking to minimize:

$$\sum_n cnfd_n \times dist(\hat{c}_n - \hat{x}_n) \qquad (1)$$

where dist is a distance.

A decoder of this kind is often used for the decoding of error corrector codes and is used for example for the soft-decision decoding of a convolutive code. It is most usually made in the form of a Viterbi decoder (used to optimize the equation (1) with reduced complexity).

One of the particular features of the invention is that it carries out the operation of "weighting-summation" of the different paths just before this weighted-input decoding, hence after the passage into the tuner, after an estimation of the channel if any and, above all, after a separation of the carriers achieved by a possible multicarrier demodulation. This has several advantages:

it makes it possible, during the recombination of the signals coming from the different antennas, to work on the already demodulated signals (no problem of synchronization or rephasing of the signals appears in this case) and to take advantage of the information given by a channel estimation, if any;

when a multicarrier modulation is used and even in the case of the transmission of a wideband signal (needed for example to transmit the high bit rates needed for the transmission of digital television signals), it makes it possible to work on narrow-band signals.

According to the invention, the recombination is done by means of an adapter placed at input of the weighted-input decoder. This adapter makes use of the confidence information allocated to each estimation delivered by each path, to give the weighted-input decoder a total optimized estimation (adapted estimation) itself affected by an adapted confidence information element.

Thus, the weighting selectively affects each received signal (and not the totality of the signal). No additional information, as compared with a conventional receiver, is necessary.

As will be seen in the example described here above, this approach is well suited to multicarrier systems, the data borne by each carrier being weighted independently. It is clear however that it can be applied also to single-carrier systems.

The single FIGURE shows a simplified block diagram of a COFDM modulation receiver implementing a two-antenna diversity. It is easy to generalize this principle to more than two antennas and more generally to two or more paths as defined here above.

The term COFDM is understood to mean especially, in this embodiment, the association of a convolutive code (known as an internal code), a block code (called an external code) an a multicarrier OFDM modulation. An example of such a system is described for RF digital television broadcasting in the DVB-T standard (see for example the ESTI document "Digital Video Broadcasting (DVB); Framing structure, channel coding and modulation for digital terrestrial television (DVB-T)", ETS draft, 3000744, March 1997).

Hereinafter, for reasons of simplification, we shall describe only the processing of the nth symbol sent, borne by the carrier k, namely $x_k(n)$.

The receiver has two paths $10_1$ and $10_2$, each having an antenna $101_1$, $101_2$ and a tuner $102_1$, $102_2$, an analog-digital converter ADC $103_1$, $103_2$, a multicarrier demodulation module $104_1$, $104_2$ and an estimation module $105_1$, $105_2$.

These different details are known, and it is not necessary to describe them in greater detail. The symbol $x_i(n)$ is received by each of the antennas and processed independently by each of the paths $10_1$ and $10_2$. Thus, each of the demodulation modules $104_1$, $104_2$ delivers the corresponding information $y_{1,k}(n)$ and $y_{2,k}(n)$, from which the estimation modules $105_1$ and $105_2$ produce:

a path estimation: $\hat{x}_{1,k}(n)$ and $\hat{x}_{2,k}(n)$;

a path confidence information element: $cnfd_{1,k}(n)$ and $cnfd_{2,k}(n)$.

In other words, the signal at output of each antenna undergoes all the conversions carried out by a standard receiver up to (but not including) weighted-input decoding. Then, for each path i, there is obtained a noise-ridden estimate $\hat{x}_{i,k}(n)$ of the symbols transmitted on the channel and a value of confidence $cnfd_{i,k}(n)$ in this estimation.

Reference may be made to the document dTTb Module 3 (dTTb/M3/284 "System Specification for the Second dTTb Demonstrator", dTTb Module 3, Version 2.2, February 1996), and to the DVB-T standard for an exemplary mode of computation of these confidence values and estimations as well as the implementation of the associated weighted-input decoding.

The information elements $\hat{x}_{i,k}(n)$ and $cnfd_{i,k}(n)$ are fed into an adaptation module 11, a new element according to the invention, which gives the weighted-input decoder 12 an estimation and an adapted confidence value (optimized).

Since the decoding works synchronously on each path, an improved estimation of the symbols transmitted on the channel $\hat{x}_{Adap,k}(n)$ is obtained by computing the sum of the estimations obtained previously, weighted by their respective confidence values. The confidence value $cnfd_{Adap,k}(n)$ associated with this estimation is equal to the sum of the confidence values.

The adapter 11 therefore carries out the following operations:

$$\left. \begin{array}{l} cnfd_{Adap,k}(n) = \sum_i cnfd_{i,k}(n) \\ \hat{x}_{Adap,k}(n) = \left( \sum_i cnfd_{i,k}(n) \times \hat{x}_{i,k}(n) \right) \Big/ \left( \sum_i cnfd_{i,k}(n) \right) \end{array} \right\} \forall k \text{ carrier, } \forall n \text{ integer}$$

Naturally, this is only an example and other weighting methods may be used. It is also possible to take account of other information elements (representing for example the type of data, a specific quality of a channel, an error rate, etc.) to optimize these operations.

Then, the weighted input decoder 12 conventionally decodes the internal code. Again conventionally, the processing continues with the decoding of the external code 13 and then the source decoding 14.

In the particular case of a standard Viterbi decoding that does not take account of the estimation of the channel, resorting to a soft decision is equivalent to the use of an estimated "hard" value of the symbol transmitted, associated with a measurement of confidence in this estimation. This confidence is then, for example, a function of the (assumed) relationship of the noise affecting the transmission and of the distance between the estimated "soft" value and the estimated "hard" value chosen.

Thus, the notion of "estimated path value" according to the invention can be, without distinction, soft or hard.

Furthermore, the confidence information may be of any appropriate type and not exclusively from a channel estimation.

As already stated, the invention can be applied to all situations where several paths have to be processed, especially for the processing of P of N data fluxes processed, coming from a signal transmitted by multicarrier modulation (distinct or not distinct for each flow) and containing the information conveyed by a subset (not necessarily identical for each flow) of all the carriers implemented in this signal.

The invention claimed is:

1. A device for the reception of a multicarrier signal, formed by a set of carrier frequencies, said device implementing at least two reception paths supplied with data flows, each conveying a same source symbol ($x_k(n)$), each of said reception paths comprising an estimator associating with each source symbol received, an estimated path value and a corresponding path confidence information element, wherein said source symbols are conveyed by a subset of said set of carrier frequencies, said device comprising means for combining said estimated path values delivering:

an adapted estimated value, obtained from said estimated path values, in taking account of said corresponding path confidence information element to weight said estimated path values; and an adapted confidence information element, said device further comprising:

a weighted-input decoder supplied by said adapted estimated value, wherein said means for combining computes said adapted estimated value as follows:

$$\hat{x}_{Adap,n} = \left(\sum_{i=1}^{N} cnfd_{i,n} \times \hat{x}_{i,d}\right) / \left(\sum_{i=1}^{N} cnfd_{i,n}\right)$$

where:

$\hat{x}_{i,n}$ is the estimated value of the symbol received on the path i;

$cnfd_{i,n}$ is the corresponding path confidence information element; and

N is the number of paths.

2. A device for reception according to claim 1, wherein the reception device implements at least two antennas supplying distinct reception paths.

3. A device for reception according to claim 1, wherein each of said reception paths comprises a first module shaping and demodulating the received signal and a second module determining said estimated path values and said corresponding confidence information elements, said device further comprising a single module supplied by said second module of each reception path, and providing for said means for combining said adapted estimated values and said weighted-input decoder supplied with said adapted estimated value.

4. A device for the reception of a multicarrier signal, formed by a set of carrier frequencies, said device implementing at least two reception paths supplied with data flows, each conveying a same source symbol ($x_k(n)$), each of said reception paths comprising an estimator associating with each source symbol received, an estimated path value and a corresponding path confidence information element, said source symbols being conveyed by a subset of said set of carrier frequencies, said device comprising means for combining said estimated path values delivering:

an adapted estimated value, obtained from said estimated path values, in taking account of said corresponding path confidence information element to weight said estimated path values, and;

an adapted confidence information element, as a sum of said path confidence information elements, said device further comprising:

a weighted-input decoder supplied by said adapted estimated value, wherein said means for combining computes said adapted confidence information element as follows:

$$cnfd_{Adap,n} = \sum_{i=1}^{N} cnfd_{i,n}$$

where:

$cnfd_{i,n}$ is the corresponding path confidence information element associated with the path i; and N is the number of paths.

5. A device for reception according to claim 4, wherein the reception device implements at least two antennas supplying distinct reception paths.

6. A device for reception according to claim 4, wherein each of said reception paths comprises a first module shaping and demodulating the received signal and a second module determining said estimated path values and said corresponding confidence information elements, said device further comprising a single module supplied by said second module of each reception path, and providing for said means for combining delivering said adapted estimated values and said weighted-input decoder supplied with said adapted estimated value.

7. A method for the reception of a multicarrier signal, formed by a set of carrier frequencies transmitted simultaneously, implementing at least two reception paths supplied with data flows, each conveying the same source symbols, each of said paths implementing a step of estimating of a transmission channel associating, with each source symbol received, an estimated path value and a corresponding path confidence information element a source symbol being conveyed by a subset of said set of carrier frequencies, said method comprising:

a combination step of delivering:

an adapted estimated value, obtained from said estimated path values in taking account of said corresponding path confidence information element to weight said estimated path values; and an adapted confidence information element with each of said adapted estimated values, wherein said adapted estimated value is computed as follows:

$$\hat{x}_{Adap,n} = \left(\sum_{i=1}^{N} cnfd_{i,n} \times \hat{x}_{i,n}\right) / \left(\sum_{i=1}^{N} cnfd_{i,n}\right)$$

where:

$\hat{x}_{i,n}$ is the estimated value of the symbol received on the path i, $cnfd_{i,n}$ is the corresponding path confidence information element, and N is the number of paths; and a step of weighted-input decoding, taking into account said adapted estimated values.

8. A method for the reception of a multicarrier signal, formed by a set of carrier frequencies transmitted simultaneously, implementing at least two reception paths supplied with data flows, each conveying the same source symbols, each of said paths implementing a step of estimating of a transmission channel associating, with each source symbol received, an estimated path value and a corresponding path confidence information element, a source symbol being conveyed by a subset of said set of carrier frequencies, said method comprising:

combining and delivering:

an adapted estimated value, obtained from said estimated path values in taking account of said corresponding path confidence information element to weight said estimated path values, and an adapted confidence information element with each of said adapted estimated values, wherein said adapted confidence information element is computed as follows:

$$cnfd_{Adap,n} = \sum_{i=1}^{N} cnfd_{i,n}$$

where:

$cnfd_{i,n}$ is the corresponding path confidence information element associated with the path i, and N is the number of paths; and weighted-input decoding, taking into account said adapted estimated values.

\* \* \* \* \*